United States Patent
Heinrich et al.

(10) Patent No.: US 6,897,782 B2
(45) Date of Patent: May 24, 2005

(54) THERMAL MONITORING OF AN ELECTRIC LOAD ELEMENT

(75) Inventors: Peter Heinrich, Hinternah (DE); Karl-Heinz Preis, Buehlertal (DE); Steffen Nicolai, Ilmenau (DE); Michael Huhn, Schmiedefeld (DE); Jochen Ehrenpfordt, Nutheursbronnfal (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 3 days.

(21) Appl. No.: 10/296,634

(22) PCT Filed: Apr. 25, 2001

(86) PCT No.: PCT/DE01/01608
§ 371 (c)(1),
(2), (4) Date: Sep. 15, 2003

(87) PCT Pub. No.: WO01/91264
PCT Pub. Date: Nov. 29, 2001

(65) Prior Publication Data
US 2004/0061481 A1 Apr. 1, 2004

(30) Foreign Application Priority Data
May 25, 2000 (DE) .......................... 100 26 057

(51) Int. Cl.⁷ ............................................. G08B 17/00
(52) U.S. Cl. ...................... 340/588; 340/581; 340/584; 340/589; 340/635; 340/661; 340/449; 361/23; 361/24; 361/25
(58) Field of Search ................................ 340/581, 588, 340/589, 635, 661, 449, 584; 361/23, 24, 25, 26; 318/471, 472, 430

(56) References Cited

U.S. PATENT DOCUMENTS 5,323,287 A * 6/1994 Peter ........................... 361/24
5,627,710 A 5/1997 Schoeffler
6,137,668 A * 10/2000 Feldtkeller ................... 361/103
6,301,090 B1 * 10/2001 Mack ............................ 361/25

FOREIGN PATENT DOCUMENTS

| DE | 40 38 198 A1 | 7/1992 |
| DE | 42 16 040 A1 | 11/1993 |
| DE | 43 15 182 A1 | 11/1994 |
| EP | 0 443 465 A2 | 8/1991 |
| EP | 0 999 630 A1 | 5/2000 |
| WO | WO 99/50098 | 10/1999 |

OTHER PUBLICATIONS

International Search Report of PCT/DE01/01608, dated Sep. 18, 2001.

International Preliminary Examination Report of PCT/DE01/01608, dated Aug. 20, 2002.

* cited by examiner

Primary Examiner—Hung Nguyen
(74) Attorney, Agent, or Firm—Christie, Parker and Hale, LLP

(57) ABSTRACT

A method for monitoring thermal overload of an electric load element in a motor vehicle containing other electric consumers, which can be switched into a stand-by phase is disclosed. The load element is monitored by a control device using a calculated load temperature parameter. During a first operational phase, a power loss of the load element or a quantity that is essentially proportional thereto is evaluated for calculating the load temperature parameter. During one or more stand-by phases, the control device is switched with essentially no current between the first operational phase and a second operational phase. After the control device is switched on in the second operational phase, at least one quantity, which is characteristic for the moment of switching on, is evaluated for calculating the existing load temperature parameter.

16 Claims, 4 Drawing Sheets

THERMAL MONITORING OF AN ELECTRIC LOAD ELEMENT

CROSS-REFERENCE TO RELATED APPLICATION

This application is a National Phase Patent Application of International Application Number PCT/DE01/01608, filed on Apr. 25, 2001, which claims priority of German Patent Application Number 100 26 057.8, filed May 25, 2000.

BACKGROUND

The invention relates to a method for monitoring an electric load element for thermal overloading in a motor vehicle.

In motor vehicles a battery, charged, for example, by a generator (dynamo), stores electrical energy. When the drive motor of the motor vehicle is switched off some electric consumers are supplied by the energy stored in the battery alone. These consumers reducing the stored energy of the battery include, for example, safety devices, door locks, anti-theft devices or operation of adjusting devices.

The electrical energy stored in the battery (accumulator) has, in addition, to be sufficient after a prolonged stoppage of the drive motor, i.e. without charging by the generator, to allow starting of the drive motor even after several days or even several weeks. Therefore, there must still be sufficient electrical energy stored in the battery even in this case.

In modern motor vehicles there are a large number of electric consumers, for example integrated electric circuits for monitoring functions and control functions, and controllable load elements, such as electric motors for seat adjustments or electric window lifters, and locks, antitheft devices and power semiconductors, causing a reduction in the energy stored in the battery, but which have to be available at least at times as added features. The electric circuits also require continuous electrical energy for monitoring functions and control functions. The energy consumption is noticeably increased owing to the increasingly large number of electric circuits, so the energy reserve of the battery is used up more quickly.

Thermal monitoring of a load element is particularly necessary for load elements, such as electric motors for adjusting devices, which must not exceed a maximum temperature, as otherwise irreparable thermal damage stops the electric motor. The power loss in the armature windings (of the electric motor) occurring during operation of the load element lead to considerable heating of the electric motor.

A method is known from DE 42 16 040 A1 for determining the temperature of the armature windings without a sensor where heating of the electric motor is determined with the aid of the power loss or a variable proportional thereto, the speed of the electric motor. Once a threshold has been reached the current supply to the electric motor is switched off and the electric motor is thus protected against thermal overload.

Determination of cooling behaviour of the electric motor is known from DE 40 38 198 A1. For this purpose, the cooling behaviour over time is detected in a microprocessor and the instantaneous temperature value continuously calculated in the controller by means of an algorithm. The drawback is the high power consumption of the electric circuit and microprocessor for calculating the cooling behaviour in the controller.

SUMMARY

Therefore the object of the invention is to indicate a method which monitors the load element for thermal overload during the operating phase of the load element and considerably reduces the power consumption of the monitoring electric circuit, at least between the operating phases, without having to measure the temperature of the load element with a temperature sensor.

In the method for monitoring thermal overload of an electric load element in a motor vehicle further electric consumers can be switched into a stand-by phase. In the stand-by phase only the components of an electric circuit of the consumer required, for example, to awaken, i.e. activate, the non-active components of the electric circuit for operation, are to continue to be active with very low power consumption.

The load element, for example an electric motor or a discrete power semiconductor, is accordingly monitored by a controller at least with the aid of a calculated load temperature parameter. Thermal monitoring can incorporate further variables, for example a load resistance, so a short-circuit caused owing to thermal overload is detected.

To carry out the calculation of the load temperature parameter a user-specific electric circuit (ASIC) with an implemented algorithm is integrated in the controller. For monitoring the load temperature parameter is compared with thresholds. The thresholds are, for example, preset in that they are stored in a non-volatile memory in accordance with the type of load element. Alternatively, the thresholds can be varied as a result of changing external parameters. In the event of an impending thermal overload, electrical power supplied to the load element is, for example, adjusted downward or switched off by the controller when a threshold is exceeded.

During a first operating phase a power loss in the load element or a variable substantially proportional thereto, is evaluated to calculate the load temperature parameter. This occurs, for example, in accordance with the method illustrated in DE 42 16 040 A1 or, alternatively, with the aid of the measured heating of a semiconductor power stage to control a load current of the load element. In addition to the power loss or the proportional variable further factors, for example a pulse duty factor of a known pulse-width modulation signal for controlling the load element, can be evaluated. Within the operating phase the load element is supplied with current at least at times, and this leads to heating of the load element and to a change in the load temperature parameter to be calculated according to the invention.

During one or more stand-by phases, also called sleep mode, between the first operating phase and a second operating phase, the controller is switched with substantially no current. The controller switched with substantially no current does not allow an evaluation by an algorithm as supplying the controller with electrical energy during the stand-by phase only allows functions with very low energy consumption. Therefore, all energy consumers, for example a microcontroller of the controller, and therefore also the load element, are switched without current. An activating electric circuit with a very low power consumption, for example less then 100 µA, allows activation of the components of the controller which are no longer active.

After the controller has been switched on again in the second operating phase at least one first parameter characteristic of the switching-on instant is evaluated to calculate the current load temperature parameter. As cooling of the load element extends over a prolonged time frame, for example 30 minutes, a first parameter for an instant within a time interval, for example 30 seconds before or after the switching-on instant, is also characteristic of the switching-on instant. Here, one or more first parameters characterising the switching-on instant of the controller, can be determined and evaluated.

The current load temperature parameter characterises the temperature of the load element at the switching-on instant. If it is above a threshold for risk-free switching on of the load element, the load element cannot be operated. If it is below a threshold the load element is supplied with current and the load temperature parameter again evaluated with the aid of the power loss or a variable substantially proportional thereto, and the last current load temperature parameter of the switching-on instant. The method can be repeated a plurality of times for a plurality of changes between stand-by phase and operating phase.

A concrete example for calculating the load temperature parameter is described in more detail in the embodiments.

In an advantageous development of the invention at least one second parameter characteristic of a switching-off instant of the first operating phase is stored in a non-volatile memory. The first parameter and the second parameter are evaluated to calculate the load temperature parameter. The second parameter is—like the first parameter for the switching-on instant—characteristic of the switching-off instant within a certain prolonged time frame, i.e. an uncertainty in terms of time of for example 20 seconds. A plurality of second parameters characterising the switching-off instant are also stored in a non-volatile memory. The non-volatile memory is arranged in the controller or in an electronic module connected to the controller via a data circuit. EEPROMs or flash memory, for example, are suitable as non-volatile memories. By using the non-volatile memory data for calculating the load temperature parameter is advantageously also retained beyond the stand-by phase.

In a preferred variant of the invention a measuring element substantially thermally decoupled from the load element is heated during the first operating phase, for example by a separate heating current. The first parameter is determined from a temperature measured variable of the measuring element characteristic of the switching-on instant. In addition, further first parameters, for example from an ambient temperature, can be determined. Elements which cool over substantially the same or a greater time frame as/than the load element present themselves as measuring elements, so the load temperature parameter can be determined over the entire time frame of cooling from the temperature measured variable of the switching-on instant. A substantially thermal decoupling between the load element and the measuring element is given, for example, by local separation or a thermal separating element between load element and measuring element. Both elements, the measuring and the load element, are at the same ambient temperature in the cooled state, for example the temperature inside the motor vehicle. The advantage of using the thermally decoupled measuring element is that cooling behaviour of the load element can be determined with the aid of the temperature of the measuring element which cools with the load element during the stand-by phase, without requiring a sensor arranged on the load element.

In a development of the preferred variant a power stage of the controller controls a load current. In a dual function a component of the power stage serves for cooling, for example a power MOSFET, and is heated as measuring element by the load current. The thermally decoupled measuring element as cooling element is a component of the power stage of the controller. The power stage has, for example, a power semiconductor, for example a MOSFET, and a cooling element. The power semiconductor of the controller is thermally coupled to the cooling element. The controller controls the load current, for example of an electric motor as load element, with the power semiconductor cooled by the cooling element. The cooling element is heated during the operating phase by the load current via the power semiconductor. The heating behaviour and cooling behaviour of the cooling element is measured by a temperature sensor, for example a temperature-dependent diode or a thermoelement for generating a thermovoltage, integrated, for example, in the controller. For controllers with power semiconductors a cooling element is usually an already present component, so the monitoring function can also be implemented in the controller without additional components.

In a particularly simple configuration of the development of the invention the power stage and the load element are heated and cooled substantially proportionally owing to similar thermal behaviour. The characteristic temperature measured variable and the proportionality are evaluated to calculate the current load temperature parameter. A memory for storing a value for monitoring is not required. Even the algorithm implemented in the controller requires only a few programme steps. This embodiment of the invention also allows thermal monitoring by an analog electric circuit in the controller.

In one configuration of the invention a plurality of load elements are monitored by the controller. The measuring element (as a component of the power stage) is heated by the respective load currents of the load elements. Heating by the individual load currents is dependent in this case on further parameters, for example the current temperature of the measuring element. Here the load elements are controlled simultaneously or successively, so the respectively different period for heating is taken into account for evaluation.

To allow simple evaluation of the characteristic temperature measured variable only the load element with the greatest load temperature parameter, i.e. the load element with the greatest risk of overheating, is monitored in a first variant of the configuration. For the other load elements the current load temperature parameter of the monitored load element is adopted for the switching-on instant of the second operating phase. This simplification allows monitoring of thermal overload of the load elements without having to calculate and evaluate the load temperature parameter for each load element.

To monitor each individual load element in accordance with the configuration individually, on the other hand, a temperature measured variable is advantageously measured for the switching-off instant to calculate the respective current load temperature parameter. The temperature measured variable and the load temperature parameters of the switching-off instant of the first operating phase are stored as second parameters. Therefore, the heating behaviour and cooling behaviour for the individual load elements can advantageously be calculated during the first operating phase and the value thereof can be stored at the switching-off instant. The length of the stand-by phase, for example, is subsequently counted back from the cooling of the measuring element.

In an alternative development of the preferred variant the thermally decoupled measuring element is a separate measuring element primarily serving as comparison element, which is heated by a heating capacity controlled by the controller. The measuring element is preferably arranged on a printed circuit-board of the controller. The measuring element is, for example, a resistor already heated with a fraction, for example 1%, of a load current of the load element. To adapt the thermal behaviour of the measuring element to that of the load element a heat transition resistor of the measuring element, for example, is increased to the ambient air in that the resistor is embedded, for example, in a poorly heat-conducting ceramic or plastic jacket. The measuring element is alternatively arranged outside of the controller. This allows the heated measuring element to advantageously be used for further functions, for example as heating for a motor vehicle door lock.

According to a configuration of the alternative development of the invention, the separate measuring element is advantageously heated independently of the power loss in the load element by the controlled heating capacity to a predetermined temperature with a corresponding temperature measured variable in order to determine the cooling time frame from the known cooling behaviour of the measuring element. This part of the method for thermal monitoring uses the measuring element to measure a cooling time frame of the load element in that the predetermined temperature measured variable of the switching-off instant and the characteristic temperature measured variable are evaluated as first parameter. To calculate the current load temperature parameter the specific time frame and an end value of the load temperature parameter of the first operating phase are evaluated as second parameter.

A configuration of the development of the invention provides that the heating capacity to heat the measuring element is correlated with the power loss in the load element or the variable substantially proportional thereto. The heating capacity and the power loss are advantageously correlated via proportionality factors, exponential factors or other mathematical equations which can be meaningfully used for this purpose. The simplest correlation is a direct proportionality between the heating capacity and the power loss or between the heating current and the load current. To calculate the current load temperature parameter the characteristic temperature measured variable and the correlation of the heating capacity with the power loss or the variable substantially proportional to the power loss are evaluated in the controller or an electronic module. The correlation for heating and cooling of the measuring element can be different for each load element to allow appropriate adaptation to different heating behaviour and cooling behaviour. Therefore, the one measuring element can advantageously be multiply used to monitor different types of load element, for example different types of electric motor, for example for the mirror and the window lifter of a motor vehicle door.

In a further configuration the correlation, in particular as a function of an ambient temperature, is varied by at least one correlation factor. A correlation factor of this type is, for example, the aforementioned exponential factor which can describe the cooling behaviour of the load element. One or more of the correlation factors are advantageously stored as second parameters.

A delay time between the start of heating or cooling of the load element and that of the measuring element, caused by different thermal behaviour of the load element and of the measuring element, is advantageously evaluated to calculate the load temperature parameter. If, for example, the cooling behaviour is calculated in accordance with a heat flow network model then the various heat capacities of the load element and measuring element result in different time constants, causing the delay time. The incorporation of the time constants noticeably increases the accuracy of the calculation.

It is also significant the a temperature sensor thermally coupled to the measuring element is interrogated for measuring the temperature measured variable. The temperature sensor is, for example, integrated in the measuring element or fastened thereto to ensure a low thermal transition resistance.

In an alternative variant of the invention a measuring element with an associated temperature measured variable is not required. Rather, the first parameter is transmitted via a data circuit from an electronic module of the motor vehicle to the controller. Closed-circuit electric or optical data circuits, such as a serial data line or a system bus, but also all other type of data circuits, such as infrared light transmission or radio systems, are suitable as data circuit. An electronic module connected to the controller is, for example, a central module or diagnosis module for controlling or diagnosing all motor vehicle operating units. The data circuit consists of the electronic module for the controller, or is bidirectional.

According to a development of the alternative variant of the invention, a time code from a system clock is transmitted via the data circuit to the controller as first parameter. The time code from the system clock is, for example, a concrete time or one of the continuous numbers of a counting mechanism which can be present as binary or hexadecimal numbers. The system clock is not switched without current so the system clock continuously runs on even when the motor vehicle is parked. However, the system clock requires only a very small current, comparable with a watch.

The system clock is arranged, for example, in the vicinity of the controller or in the semi-conductor chip of the controller and the time code is read out via a serial or parallel interface supplied in the operating phase as data circuit. Therefore, the transmission and signalling via the data circuit or via a network of a plurality of data circuits is advantageously dispensed with. In addition, the controller with the system clock as functional unit is independent of other functional units of the motor vehicle and can also continue to be operated as a separate functional unit even in the event of failure of the other functional units.

In a configuration of the development the time code is addressed to the controller via a system bus by means of a data protocol. In this case the system bus is the bidirectional data circuit between the controller and, for example, the central electronic module. Addressing takes place, for example, with a bit sequence characterising the controller or with a split code characterising the controller allowing a known separation of the data owing to appropriate folding and decoding in the receiver. The controller requests the time code from the electronic module via a data protocol. The data protocol controls the data sequence and verification in a known manner here. If the time code is transmitted via a system bus only one central system clock is necessary which is often already present in a motor vehicle.

A plurality of load elements are advantageously monitored by the controller in that the load temperature parameters at the switching-off instant and the switching-off instant are stored and evaluated at the switching-on instant for calculation. Alternatively, the highest values of the load temperature parameters and the switching-off instants are stored as second parameters of the respective load elements for calculation.

In an advantageous development of the alternative variant an end value of the load temperature parameter of the first operating phase is transmitted via a system bus as data circuit from the controller to the electronic module. The end value is stored in the electronic module with a first time value. After the switching-on instant the first time value and the second time value characterising the switching-on instant as first parameter, or the time difference between the second time value and the first time value as a first parameter, and the end value are transmitted from the electronic module to the controller. No memory is required in the controller for this development. The data transmitted via the system bus is stored in the electronic module, for example in a RAM. Therefore, thermal overloads can be recorded particularly easily in a diagnosis file and are available to the motor vehicle servicer in the workshop.

In addition, load element codes are advantageously transmitted via the system bus in a data protocol. The transmitted first time value, second time value and the end value are assigned to the load element codes. The load element code is, for example, a bit sequence with which the controller or the electronic module can assign the data transmitted via the system bus to the load elements for monitoring.

The invention will be described in more detail hereinafter with the aid of embodiments and with reference to drawings, in which:

DETAILED DESCRIPTION OF THE INVENTION

Figure 1:
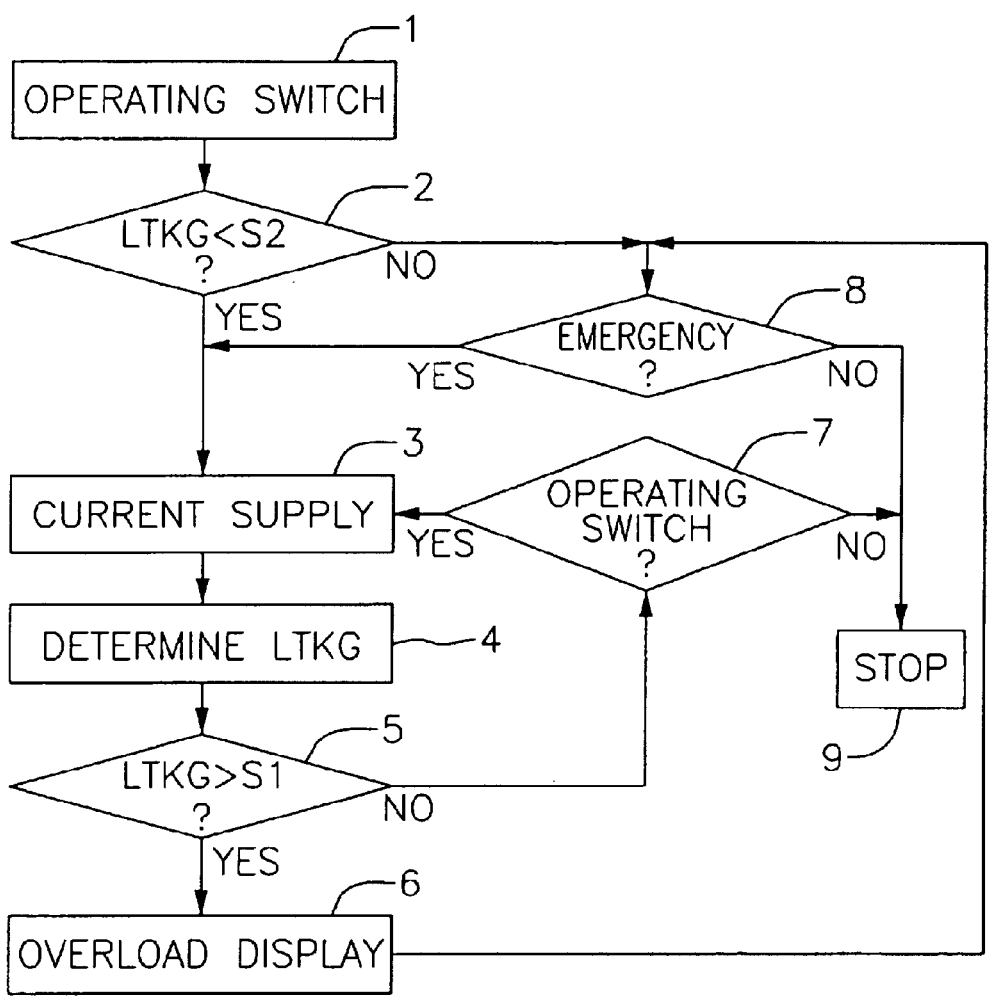
FIG. 1 is a schematic sequence of an activation and thermal monitoring of a load element.

FIG. 1 shows a schematic sequence of an activation and thermal monitoring of a load element. The activation and thermal monitoring is described, by way of example, for an electric motor of a window lifter as load element.

In step 1 an operating switch to close the window is actuated by a vehicle occupant. The operating switch is connected to the controller and is cyclically scanned thereby or by an electronic module connected to the controller, as to whether there is a closed contact.

After scanning the operating switch the load temperature parameter LTKG is compared in step 2 with a second threshold S2 (a lower threshold for temperature monitoring). If the load temperature parameter LTKG is less than the second threshold the temperature of the electric motor is not critical and the electric motor is supplied with current in step 3. Otherwise, for a load temperature parameter LTKG greater than the second threshold S2 a check is made in step 8 as to whether there is an emergency.

The current supply in step 3 is continued until the sequence in step 9 leads to the electric motor being stopped. The load temperature parameter LTKG is cyclically determined in intervals in step 4 during the current supply to the electric motor. After the respective determination of the load temperature parameter LTKG the latter is compared in step 5 with a first threshold S1 an upper threshold for temperature monitoring. If the load temperature parameter LTKG is not greater than the first threshold S1 then a check is made in step 7 as to whether the operating switch is still actuated and in the positive case the current supply of step 3 is continued.

If, on the other hand, the load temperature parameter LTKG exceeds the first threshold S1 an overload display is activated in step 6 and the thermal load displayed to the occupant or a diagnosis apparatus. After the overload has been displayed in step 6 a check is made in step 8 as to whether there is an emergency, for example jamming of an occupant's body part between door frame and window. In an emergency a current supply is allowed even in the event of thermal overload in order to allow release of the trapped occupant by reversing the direction of movement of the electric motor. If there is no emergency in step 8 the current supply to the electric motor is stopped in step 9 to protect the electric motor against thermal damage.

Figure 2:
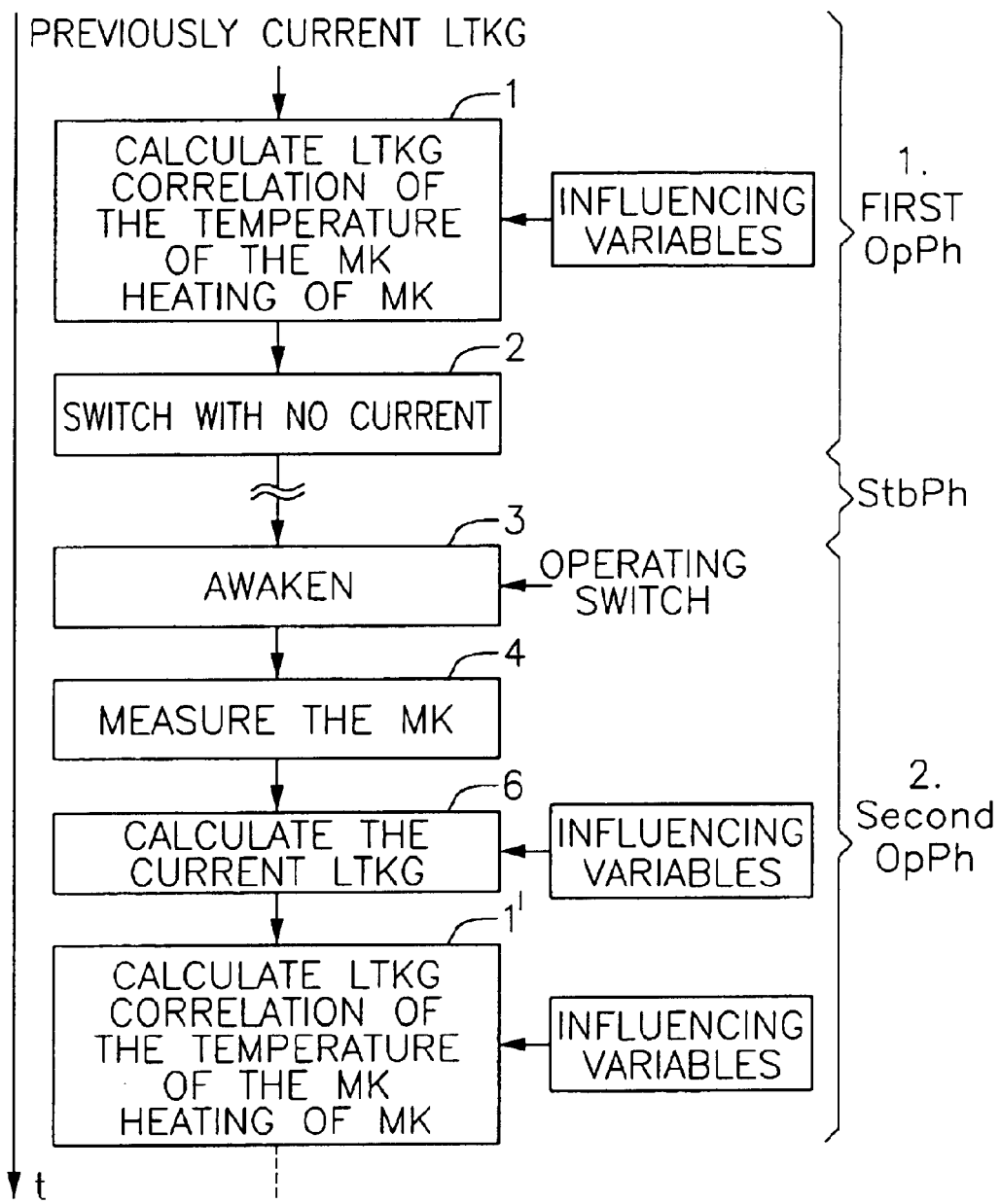
FIG. 2 is a first schematic diagram of a sequence for calculating a load temperature parameter.

FIG. 2 shows a first schematic diagram of a sequence for calculating the load temperature parameter LTKG. To determine the load temperature parameter LTKG, a cooling/measuring element MK with a power semiconductor is used in double function to cool the power semiconductor for control of an electric motor, for example for seat adjustment, on the one hand, and, on the other hand, to use the cooling element MK as measuring element, of which the temperature is measured by means of a temperature measured variable to calculate the load temperature parameter LTKG. The load temperature parameter LTKG or the temperature measured variable is, for example, directly the temperature in Celsius, Kelvin or Fahrenheit, or for one bite, for example 128 temperature stages are divided by linear, degressive or progressive temperature intervals. The temperature measured variable is a comparison variable from which the load temperature parameter LTKG is calculated by means of an adapted algorithm.

A current load temperature parameter LTKG is assumed before step 1. If there is a time interval between the first operating phase first OpPh and a preceding operating phase which is greater than a threshold the current load temperature parameter LTKG before the first operating phase first OpPh is set equal to an ambient temperature measured variable as it is to be assumed that the electric motor is cooled to the temperature of the environment of the electric motor. The time threshold is, for example, greater than 5 hours. To measure the temperature of the environment the ambient temperature measured variable is determined from the thermovoltage of a thermoelement integrated on the controller as measuring sensor.

In step 1 the load temperature parameter LTKG is calculated and the cooling element MK heated by the power loss in the power semiconductor. The calculation is made in a microcontroller with the aid of an algorithm by evaluating the power loss or a variable substantially proportional thereto, for example the load current through the coil windings of the electric motor or the speed of the electric motor, as is known, for example, from DE 42 16 040 A1. The parameters of the algorithm, for example a logarithm factor or a proportional factor, are fixed for a type of electric motor with the aid of a heat capacity and a heat transmission resistance to the surrounding air and are stored in a memory (ROM) of the controller. The ambient temperature measured variable is also evaluated as temperature-dependent influencing variable of the algorithm for calculating load temperature parameter LTKG.

Alternatively to the above-described calculation methods the parameters of the algorithm and the type of algorithm (root terms, proportional terms, exponential terms) are applied with changed parameters in accordance with changed environmental conditions and the algorithm formed again in each case. Therefore, the parameters and factors of the algorithm are adjusted from electric motor-specific parameters and, for example, the ambient temperature measured variable. The electric motor-specific parameters are adapted in accordance with the type of electric motor, mechanical fastening and site of fastening. If, for example, the electric motor is fastened to a metal part of a motor vehicle seat and thermally coupled thereto via a metal piece the additional heat capacity of the metal part characterises the parameters of the coupled electric motor. Further influencing factors are the site of fastening, for example in the vicinity of a cooling fan or inside the seat upholstery, and the power of the electric motor with respect the load to be moved, for example of an electric motor for a seat height adjustment or an electric motor for a head support. Further influencing variables are the load current or the speed of the electric motor, and the pulse duty factor of a pulse-width modulation control signal (PWM).

At the end of the first operating phase first OpPh, the controller, except for an electric circuit with low power consumption, is switched without current in step 2 to awaken the controller. During the stand-by phase StbPh the electric motor and the cooling element MK of the power semiconductor cool. To allow a particularly simple calculation of the load temperature parameter LTKG the cooling behaviour of the cooling element is matched to that of the electric motor. Therefore, the size and surface of the cooling element is matched such that the cooling element and the electric motor heat proportionally and in the stand-by phase StbPh cool substantially proportionally. The temperature of the cooling element MK is correlated with the power loss and therefore the load temperature parameter LTKG in accordance with this proportionality.

In step 3 the controller is awakened by operating of the operating switch in which the electric circuit for switching on the controller switches the components of the controller switched off in the stand-by phase to the operating voltage and the microcontroller of the controller starts a routine. In addition to the operating switch other actuated functional units lead to an awakening of the controller in the second operating phase second OpPh. If, for example, a motor vehicle ignition key is turned or a dynamo driven by a drive motor a generated signal for awakening all operational units is also transmitted via a signal line to the controller. Other causes of signal generation are, for example, the actuation of the motor vehicle door lock or an emergency operation controlled by a module.

A temperature measured variable characteristic of a switching-on instant of the controller is determined in step 4. For this purpose the microcontroller controls a temperature sensor integrated in the cooling element MK, for example a temperature-dependent resistor. The current load temperature parameter LTKG of the switching-on instant is determined in step 6 from the characteristic temperature measured variable and a proportionality factor representing the proportionality between the cooling behaviour of the cooling element MK and that of the electric motor. The load temperature parameter LTKG is calculated in step 1' in the same way as the calculation in step 1 with changed environmental conditions, for example a higher ambient temperature measured variable. The current load temperature parameter LTKG in the second operating phase second OpPh is possibly substantially increased by that of the first operating phase first OpPh for a brief stand-by phase StbPh.

Figure 3:
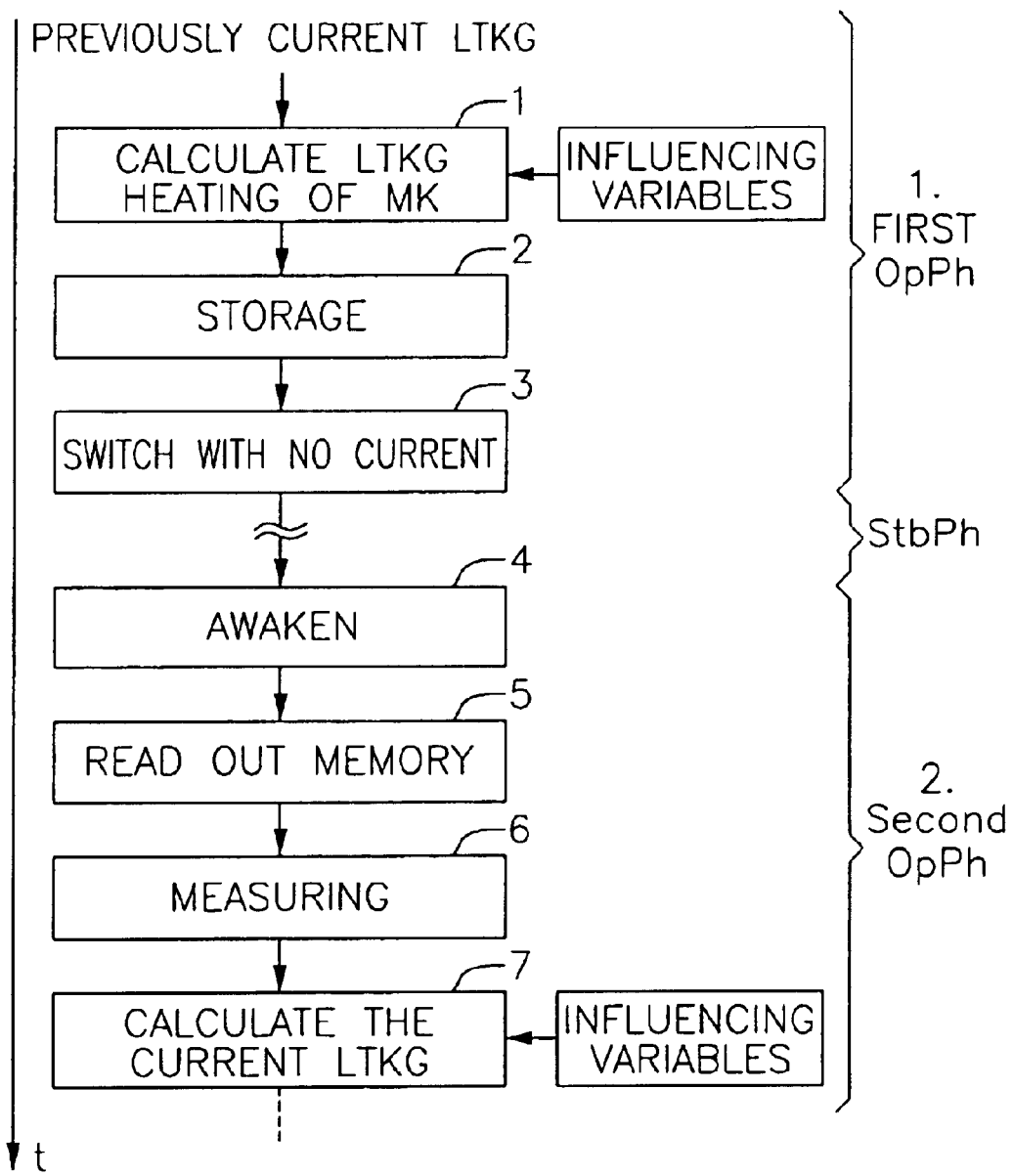
FIG. 3 is a second schematic diagram of a sequence for calculating a load temperature parameter.

FIG. 3 shows an alternative, second schematic diagram of a sequence for calculating a load temperature parameter LTKG. As an alternative no algorithm is used to calculate the load temperature parameter LTKG in FIG. 2. Standard measured values of the respective electric motor types are determined from several series of measurements of an electric motor type, for example by averaging the measuring results. A plurality of standard measured values are stored in a table in the controller for various temperatures of a temperature range. In addition, the standard measured values are weighted by various influencing variables, for example the ambient temperature measured variable. To calculate the load temperature parameter LTKG intermediate values of the standard measured values are, by way of example, interpolated linearly.

A separate measuring element MK serving exclusively as comparison element is heated independently of the current supply of the electric motor by a separate heating current controlled by the controller to a predetermined temperature to determine a time interval (duration of the stand-by phase) on the basis of a known cooling behaviour. The heating capacity for heating the measuring element MK is controlled by the separate heating current of the controller. The predetermined temperature is varied on the basis of the ambient temperature, so a time interval sufficiently long for analysis of the cooling of the electric motor can be determined via cooling of the separate measuring element MK.

The load temperature parameter LTKG and the predetermined temperature of the measuring element MK are stored in a non-volatile memory of the controller in step 2. If a plurality of electric motors are monitored by the controller the calculated load temperature parameter LTKG of each electric motor is stored and the controller is switched with substantially no current in step 3 (similar to FIG. 2).

After awakening the controller at the switching-on instant in step 4, the stored values are read out from the non-volatile memory in step 5. The current load temperature parameter LTKG is calculated for the second operating phase second OpPh with the measured characteristic temperature measured value from step 6 and further influencing variables, for example the current ambient temperature.

As an alternative to the two sequences described above for calculating the load temperature parameter LTKG, the temperature measured variable of a measuring element MK assigned to the electric motor is evaluated for monitoring a plurality of electric motors by the controller for each electric motor.

Figure 4:
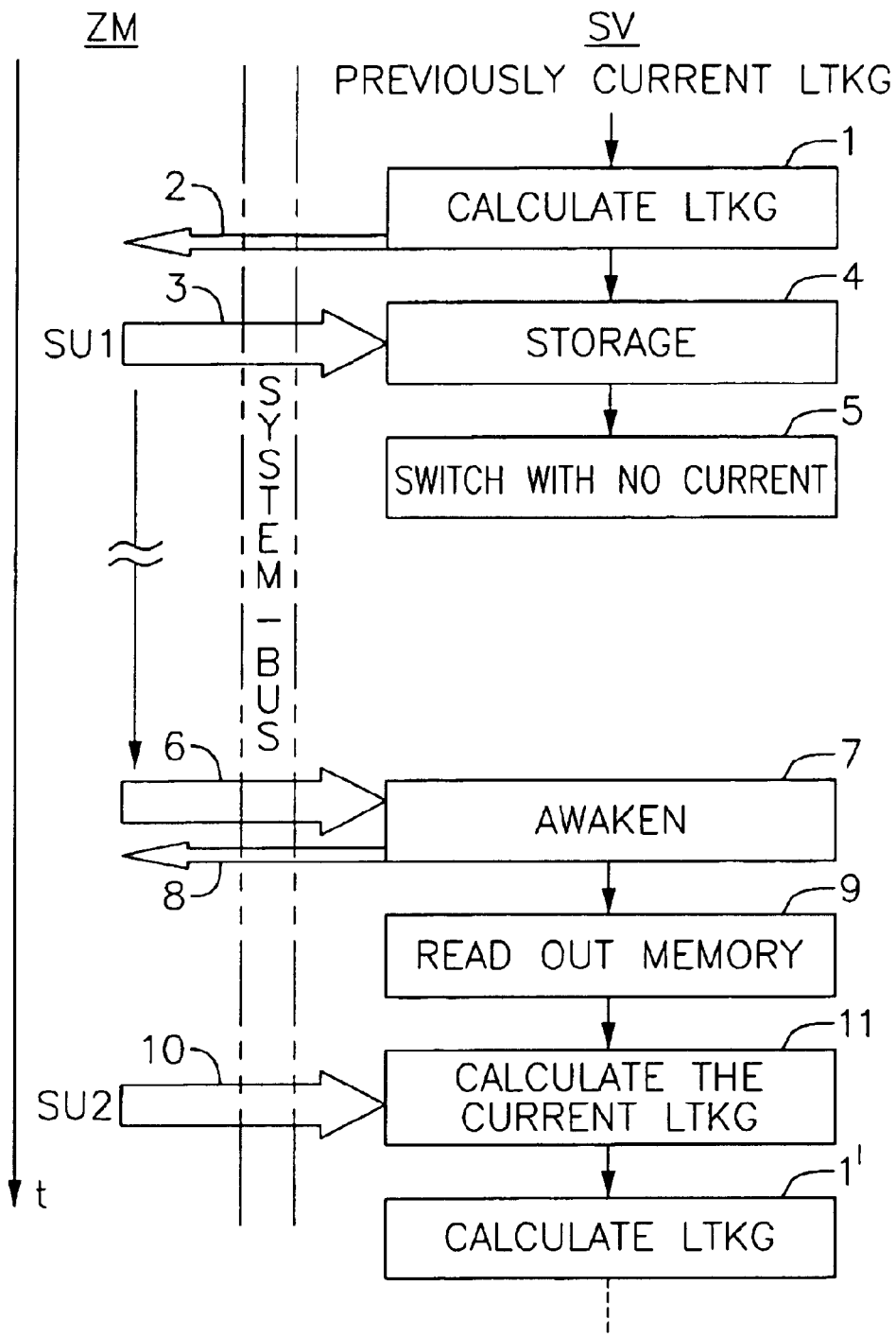
FIG. 4 is a third schematic diagram of a sequence for calculating a load temperature parameter.

FIG. 4 shows an alternative third schematic diagram of a sequence for calculating a low temperature variable LTKG. The controller SV is connected via a system bus to a central module ZM as electronic module. Data is exchanged between the central module ZM and the controller SV by means of a protocol. A data word transmitted via the system bus has a head for addressing the controller and data with a data code for allocating the data, for example a system time SU1 or SU2. The data code contains a bit sequence with the aid of which the controller detects that the received data is a transmitted system time SU1 or SU2.

To calculate the load temperature parameter LTKG in the same manner as one of the calculation methods in FIG. 2 or FIG. 3 the heat capacity of the electric motor is additionally evaluated as a delay in the heating. In addition, the ambient temperature measured variable is measured from the temperature in the vicinity of the controller SV and a value of the ambient temperature measured variable characteristic of the switching-off instant of the controller SV is stored in step 4.

Beforehand the controller SV requests the first system time SU1 (i.e., system time at switching off instant) as second parameter in step 2 from the central module ZM via the system bus, the parameter being transmitted in step 3 via the system bus to the controller SV and also being stored there in step 4.

As an alternative to scanning the system time SU1 the system time can be transmitted at the same time cyclically, for example every 20 seconds, via the system bus to all operational units and consumers. An uncertainty in terms of time of a time interval, for example, of 20 seconds, is not critical as a time fault for determining the temperature of the electric motor for an electric motor cooling slowly in relation to the time interval.

In step 5 the controller is switched with substantially no current. After a stand-by phase the controller SV is awakened in step 7 by the central module ZM via the system bus. For this purpose the central module ZM transmits a awaken signal in step 6, for example owing to the door lock being opened. The controller SV then transmits the request for a second system time SU2 (i.e. system time at switching on instant) transmitted in step 10 via the system bus to the controller SV.

The memory of the controller SV is read out beforehand or at the same time and to calculate the current load temperature LTKG in step 11 the stored load temperature parameters LTKG of the switching-off instant, the ambient temperature measured variables of the switching-off instant, the two system times SU1 and SU2 as time codes and the ambient temperature measured variable of the switching-on instant are evaluated. If, for example, exponential calling of the electric motor is assumed for this purpose then for a constant ambient temperature during the stand-by phase the load temperature parameter LTKG of the electric motor can be determined as $$LTKG_{current} = LTKG_{switching\text{-}off\ instant} e^{-k(SU2-SU1)}$$

wherein $LTKG_{switching\text{-}off}$ instant is the load temperature parameter LTKG at the switching-off instant and K the exponential factor.

For evaluation an algorithm characteristic of the cooling of the electric motor is used which incorporates all ambient parameters of the electric motor. For example a changing ambient temperature can also easily be incorporated as variable in the exponential factor. The parameters of the algorithm, for example a logarithm factor or a proportional factor, are fixed for a type of electric motor with the aid of a heat capacity and a heat transmission resistance to the surrounding air and are stored in a memory (ROM) of the controller. The ambient temperature measured variable is also evaluated as a temperature-dependent influencing variable of the algorithm to calculate the load temperature parameter LTKG, for example by the said incorporation into the exponential factor.

As an alternative to the above-described calculation methods, the parameters of the algorithm and also the type of algorithm (root terms, proportional terms, exponential terms) are applied with changed parameters in accordance with changed environmental conditions and the algorithm is formed again in each case. Therefore, the parameters and factors of the algorithm are adapted from electric motor-specific parameters and, for example, the ambient temperature measured variable. In place of an algorithm, the cooling behaviour is determined via the interpolation of standard measured values.

The load temperature parameter LTKG of step 1' is calculated in the same way as that of step 1, with the calculated current LTKG from step 11.

If the electric motor became overheated during the operating phase an error message is transmitted from the controller SV via the system bus to the central module ZM as a central diagnosis module.

What is claimed is:

1. Method for monitoring thermal overload of an electric load element in a motor vehicle with further electric consumers which can be at least partially supplied with current within an operating phase, comprising:
   monitoring the electric load element with a controller in accordance with a calculated load temperature parameter, wherein calculating the load temperature parameter comprises,
   evaluating a power loss in the electric load element or a variable substantially proportional thereto during a first operating phase of the controller to calculate the load temperature parameter during the first operating phase,
   supplying substantially no current to the electric load element during one or more stand-by phases of the controller between the first operating phase and a second operating phase, so an evaluation of the load temperature parameter is not possible, and
   evaluating at least one first parameter which characterises the switching-on instant of the controller after the controller has been switched on in the second operating phase thereof to calculate the load temperature parameter at the switching-on instant.

2. Method according to claim 1, further comprising storing at least one second parameter, characteristic of a switching-off instant of the first operating phase in a non-volatile memory, wherein the first parameter and the second parameter are evaluated to calculate the load temperature parameter.

3. Method according to claim 1, further comprising transmitting the first parameter via a data circuit from an electronic module of the motor vehicle to the controller.

4. Method according to claim 3, wherein transmitting the first parameter via a data circuit comprises transmitting a time code via the data circuit from a system clock to the controller as the first parameter.

5. Method according to claim 4, wherein the time code is transmitted cyclically.

6. Method according to claim 4, wherein the time code is transmitted for the switching-on instant.

7. Method according to claim 6, wherein the data circuit is a system bus via which the time code is addressed to the controller by means of a data protocol.

8. Method according to claim 7, wherein the controller requests the time code from the electronic module via a data protocol.

9. Method according to claim 2, wherein monitoring the load element with a controller comprises monitoring a plurality of load elements with the controller and storing for calculation the load temperature parameters at the switching-on instant and the switching-off instant and evaluating the load temperature parameters at the switching-on instant.

10. Method according to claim 3, wherein an end value of the load temperature parameter at the switching-off instant of the first operating phase is transmitted via a system bus as data circuit from the controller to the electronic module and is stored in the electronic module with a first time value, and after the switching-on instant the first time value and a second time value characterising the switching-on instant, or a difference in the time values, and an end value is transmitted from the electronic module to the controller.

11. Method according to claim 10, wherein load element codes are transmitted in a data protocol via the system bus, and the transmitted first time value, second time value and the end value are assigned to the load element codes.

12. Method according to claim 1 wherein an ambient temperature measured variable is measured from temperature in vicinity of the controller, and a first value of the ambient temperature measured variable characteristic of the switching-on instant is evaluated as one of the first parameters.

13. Method according to claims 2, wherein a second value of the ambient temperature measured variable characteristic of the switching-off instant is measured as one of the second parameters.

14. Method according to claim 12, wherein the load temperature parameter is set equal to the ambient temperature measured variable as a function of the current load temperature parameter and the ambient temperature measured variable for deviations below a threshold.

15. Method according to claim 1 wherein the load temperature parameter is set equal to an ambient temperature measured variable for a time interval between the first operating phase and the switching-on instant, the time interval being greater than a time threshold.

16. Method according to claim 1, wherein in event of overheating an error message is transmitted to a central diagnosis module and function of a thermoswitch is monitored, so a fault in a supply line is distinguished from a thermoswitch response owing to thermal overloading.

* * * * *